United States Patent
Takashima

(10) Patent No.: US 9,631,947 B2
(45) Date of Patent: Apr. 25, 2017

(54) ROTATION SENSOR

(71) Applicant: Mitsubishi Electric Corporation, Tokyo (JP)

(72) Inventor: Akira Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 53 days.

(21) Appl. No.: 14/679,496

(22) Filed: Apr. 6, 2015

(65) Prior Publication Data

US 2016/0178399 A1    Jun. 23, 2016

(30) Foreign Application Priority Data

Dec. 19, 2014  (JP) ................................ 2014-257486

(51) Int. Cl.
*G01D 5/20* (2006.01)
*G01D 5/14* (2006.01)
*G01D 11/24* (2006.01)

(52) U.S. Cl.
CPC ........... *G01D 5/145* (2013.01); *G01D 11/245* (2013.01)

(58) Field of Classification Search
CPC ..... G01D 5/2006; G01D 5/145; G01D 11/245
See application file for complete search history.

(56) References Cited

U.S. PATENT DOCUMENTS

| | | | | |
|---|---|---|---|---|
| 5,637,995 | A * | 6/1997 | Izawa ................... | G01D 5/145 324/174 |
| 6,937,010 | B1 * | 8/2005 | Takashima ............ | G01D 5/147 324/174 |
| 2005/0016297 | A1 * | 1/2005 | Aoki ..................... | G01D 5/147 73/862.635 |
| 2006/0260418 | A1 * | 11/2006 | Tsuge .................... | G01P 1/026 73/862.331 |

FOREIGN PATENT DOCUMENTS

| | | | | |
|---|---|---|---|---|
| JP | 2004351802 | A | * | 12/2004 |
| JP | 2007121105 | A | * | 5/2007 |
| JP | 2012002654 | A | * | 1/2012 |
| JP | 5014468 | B2 | | 8/2012 |

OTHER PUBLICATIONS

JP 2012002654 A—English translation.*
JP 2004351802 A—English translation.*
JP 2007121105 A—English translation.*

* cited by examiner

*Primary Examiner* — Patrick Assouad
*Assistant Examiner* — Haidong Zhang
(74) *Attorney, Agent, or Firm* — Sughrue Mion, PLLC; Richard C. Turner

(57) ABSTRACT

Provided is a rotation sensor capable of reducing manufacturing costs and improving workability. The rotation sensor includes: a case including: a bottom surface portion; and a side surface portion that defines a hollow internal space in cooperation with the bottom surface portion; a plurality of lead frames respectively having distal ends inserted into the (Continued)

case; a magnetic detection section provided to the distal ends of the plurality of lead frames arranged in parallel; a spacer provided between the plurality of lead frames and the side surface portion so as to be held in contact with an internal wall surface of the side surface portion; and an internal filling resin for filling a space portion of the hollow internal space except for the spacer, the magnetic detection section, and the plurality of lead frames.

9 Claims, 24 Drawing Sheets

F I G. 1
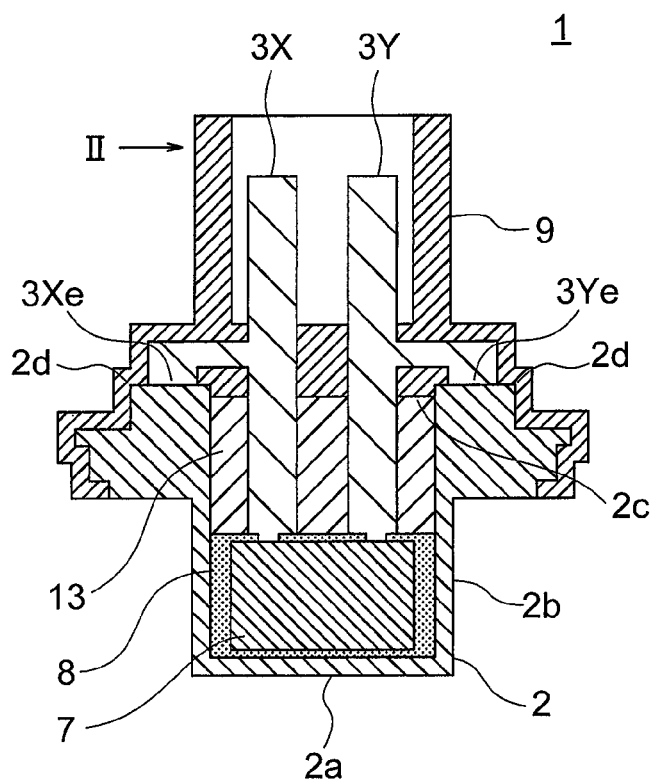
F I G. 2
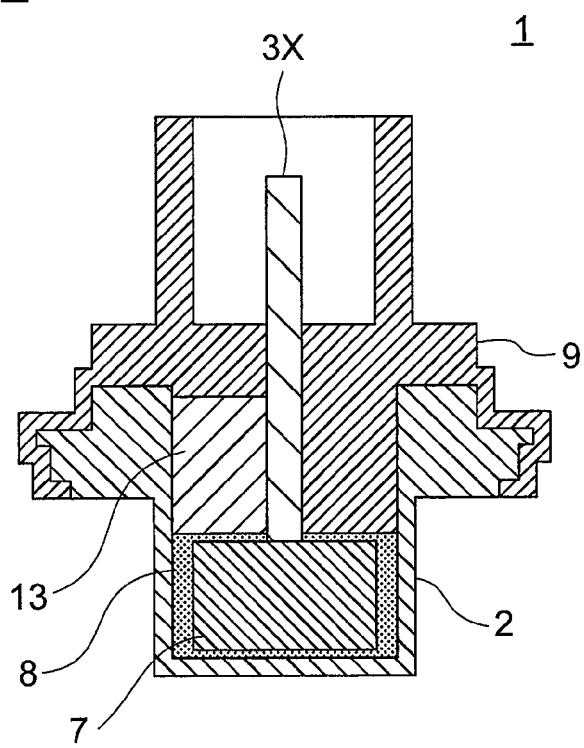

F I G. 2 2
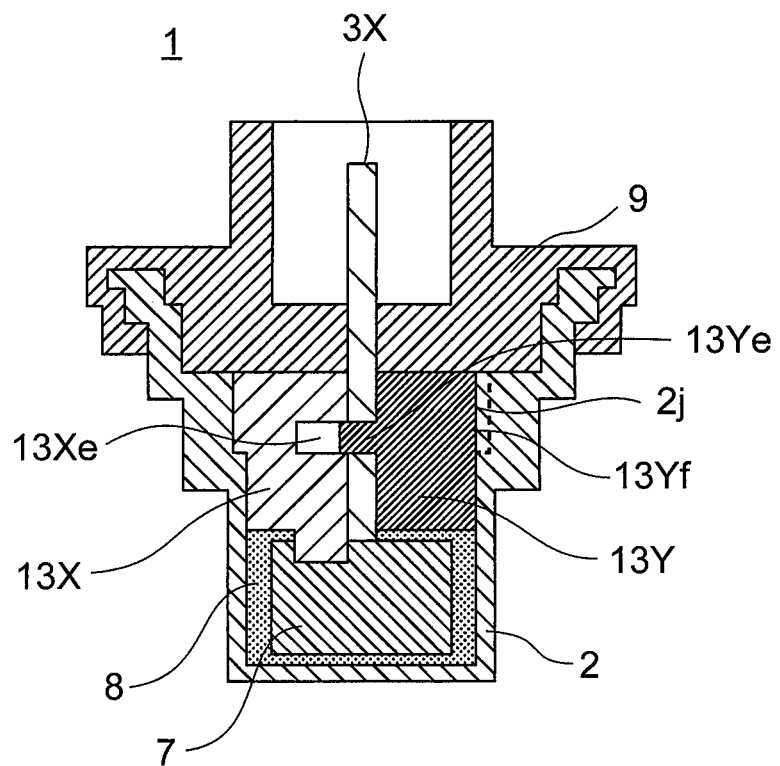

F I G. 2 5
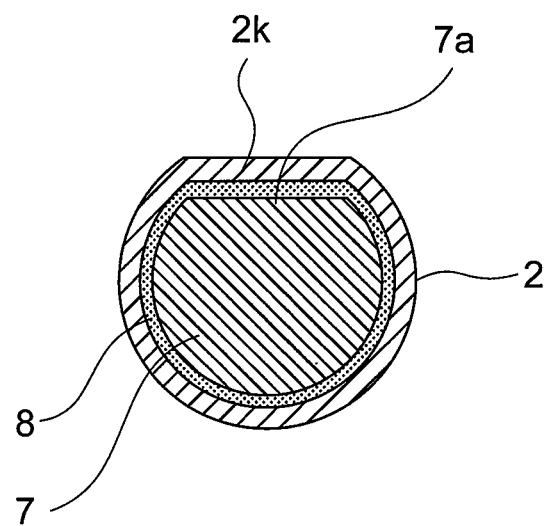
F I G. 2 6
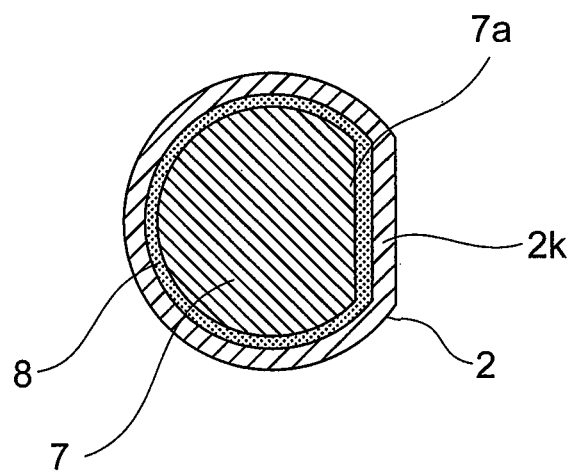

F I G. 3 3
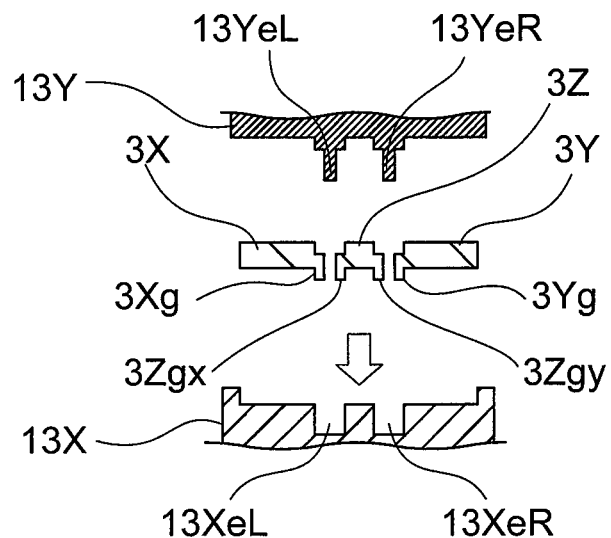
F I G. 3 4
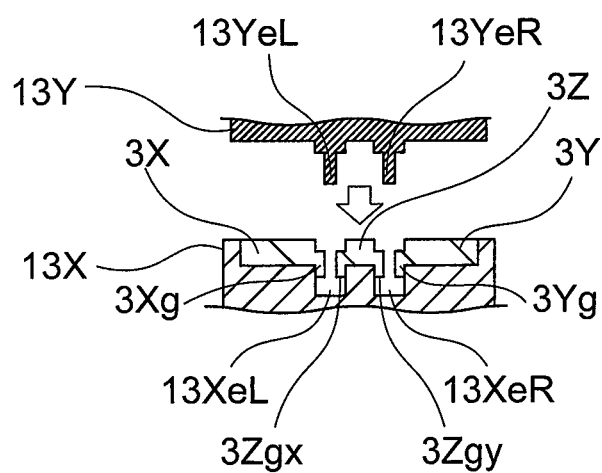

ROTATION SENSOR

BACKGROUND OF THE INVENTION

1. Field of the Invention

The present invention relates to a rotation sensor for detecting rotation of a rotating body, which is used in, for example, an engine or a transmission of an automobile.

2. Description of the Related Art

FIG. 44 is a front sectional view illustrating a related-art rotation sensor 1 disclosed in Japanese Patent Application Laid-open No. 2012-2564 (FIGS. 1, 2, and 4 to 12).

The rotation sensor 1 is inserted into an opening of a housing 10 including a rotary shaft 11 housed therein so as to be mounted to the housing 10.

A plurality of convex portions 12 made of a ferromagnetic material such as iron are provided on an outer circumferential surface of the rotary shaft 11 as a rotating body such as a connecting shaft connected to a crankshaft of an engine or the crankshaft so as to be arranged at intervals in a circumferential direction of the rotary shaft 11.

The rotation sensor 1 for detecting rotation of the rotary shaft 11 includes a case 2, a pair of lead frames 3X and 3Y, a magnetic detection section 7, an internal filling resin 8, and an exterior resin 9. The case 2 is provided at a distance from a surface of the convex portion 12, and includes a bottom surface portion 2a and a side surface portion 2b. The side surface portion 2b defines an internal space having an opening 2c in cooperation with the bottom surface portion 2a. One end of each of the lead frames 3X and 3Y is inserted into the internal space of the case 2 through the opening 2c, whereas another end thereof protrudes externally from the case 2. The magnetic detection section 7 is provided to distal ends of the lead frames 3X and 3Y so as to be electrically connected to the lead frames 3X and 3Y. The internal filling resin 8 is filled into the internal space of the case 2. The exterior resin 9 covers the opening 2c of the case 2.

A positioning portion 3Xe of the lead frame 3X and a positioning portion 3Ye of the lead frame 3Y are held in contact with an opening circumferential edge portion 2d of the case 2. In this manner, a height position of the magnetic detection section 7 inside the case 2 is determined.

The magnetic detection section 7 includes an in-sensor magnet 5 and an integrated circuit (IC) 4 that is magnetic detection means. The IC 4 includes a detection element such as a hall element and a signal processing circuit.

In the rotation sensor 1, the IC 4 generates a signal in accordance with a change in magnetic field of the in-sensor magnet 5 by the rotation of the rotary shaft 11 having the convex portions 12 made of the magnetic material.

The above-mentioned rotation sensor 1 is manufactured in the following steps as shown in FIGS. 4 to 10 of Japanese Patent Application Laid-open No. 2012-2654.

First, a lead-frame coupled body including the lead frames 3X and 3Y and a coupling portion for connecting the lead frames 3X and 3Y to each other is made of a metal plate having a rectangular shape.

Next, the magnetic detection section 7 is provided to an end of the lead-frame coupled body (first step).

Thereafter, the lead-frame coupled body and the magnetic detection section 7 are inserted into the internal space of the case 2 through the opening 2c of the case 2 (second step).

Thereafter, the internal space of the case 2 is filled with the internal filling resin 8 that is a mold resin (third step).

Next, after the internal filling resin 8 is cured, the coupling portion is removed so as to separate the lead frames 3X and 3Y from each other (fourth step).

Finally, a semi-product including the lead frames 3X and 3Y and the magnetic detection section 7 that are assembled inside the case 2 is placed inside a die (not shown) for the exterior resin 9. By molding, a connector housing for external connection and a sensor exterior part are formed on the case 2, and the opening 2c of the case 2 is covered with the exterior resin 9.

In the related-art rotation sensor 1, the internal space of the case 2 is filled with a large amount of the internal filling resin 8. A material to be used as the internal filling resin 8 is generally an epoxy resin that is expensive. Thus, there is a problem in that manufacturing costs increase.

Further, in the manufacturing of the rotation sensor 1, most attention needs to be paid to the arrangement of the magnetic detection section 7 in a predetermined dimensional position. In handling, for inserting the magnetic detection section 7 into the case 2, the pair of lead frames 3X and 3Y or the magnetic detection section 7 is inevitably required to be held. Therefore, particular attention is required to be paid so that the lead frames 3X and 3Y are not deformed. Therefore, there is another problem in that workability is low.

SUMMARY OF THE INVENTION

The present invention has been made to solve the problems described above, and has an object to provide a rotation sensor capable of reducing manufacturing costs and improving workability.

According to one embodiment of the present invention, there is provided a rotation sensor for detecting rotation of a rotating body, including:

a case including:

a bottom surface portion provided at a distance from a surface of the rotating body; and a side surface portion connected to the bottom surface portion so as to define a hollow internal space in cooperation with the bottom surface portion, the case having an opening spatially connected to the hollow internal space, which is formed in the side surface portion on a side opposite to the bottom surface portion;

a plurality of lead frames respectively having distal ends inserted into the case through the opening;

a magnetic detection section provided to the distal ends of the plurality of lead frames arranged in parallel, for detecting a change in magnetic field of a magnetic body provided to the rotating body;

a spacer provided between the plurality of lead frames and the side surface portion so as to be held in contact with an internal wall surface of the side surface portion; and an internal filling resin for filling a space portion of the hollow internal space except for the spacer, the magnetic detection section, and the plurality of lead frames.

According to the rotation sensor of the one embodiment of the present invention, the spacer is provided between the lead frame and the side surface portion so as to be held in contact with the inner wall surface of the side surface portion of the case. Therefore, the amount of use of the expensive internal filling resin can be reduced, thereby reducing the manufacturing costs.

Further, when inserting the magnetic detection section into the case, the magnetic detection section is inserted into the case with the lead frames being fixed to the spacer. As a result, deformation of the lead frames is reduced so as to improve the workability.

BRIEF DESCRIPTION OF THE DRAWINGS

FIG. 1 is a front sectional view illustrating the rotation sensor according to a first embodiment of the present invention.

FIG. 2 is a sectional view of FIG. 1, as viewed in a direction of the arrow II.

FIG. 22 is a side sectional view illustrating a modification of a rotation sensor according to a tenth embodiment of the present invention.

FIG. 25 is a sectional view taken along the line B-B in FIG. 23, as viewed in a direction of the arrows.

FIG. 26 is a sectional view taken along the line C-C in FIG. 24, as viewed in a direction of the arrows.

FIG. 33 is an explanatory view explaining a procedure assembling a spacer to a lead-frame in a second step.

FIG. 34 is an explanatory view explaining a procedure assembling a spacer to a lead-frame in a second step.

DETAILED DESCRIPTION OF THE PREFERRED EMBODIMENTS

Figure 44:
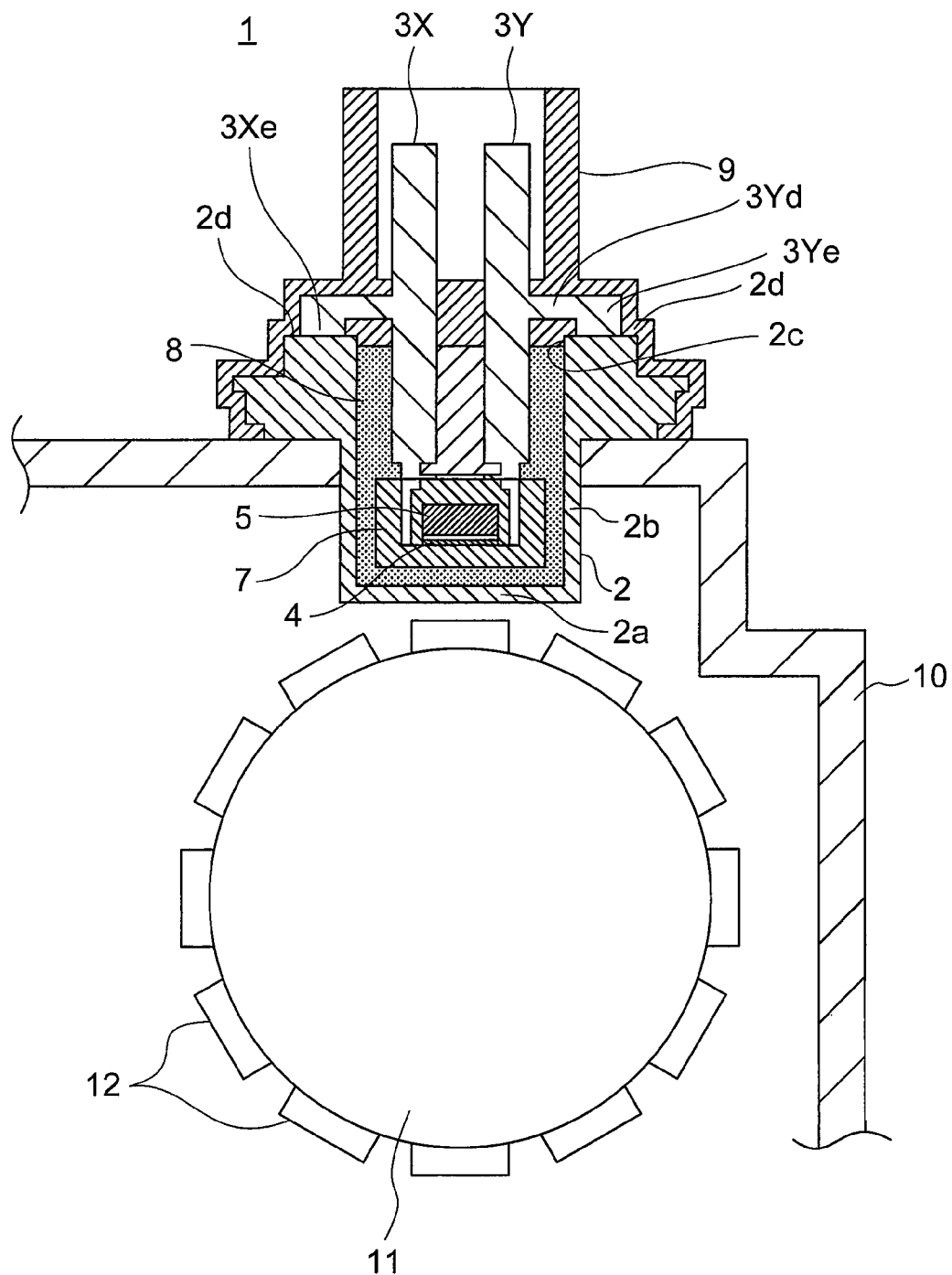
FIG. 44 is a front sectional view illustrating a related-art rotation sensor.

Now, a rotation sensor 1 according to each of embodiments of the present invention is described. In the drawings including FIG. 44 illustrating the related art, the same or corresponding members and parts are denoted by the same reference symbols for description.

First Embodiment

FIG. 1 is a front sectional view illustrating the rotation sensor 1 according to a first embodiment of the present invention, and FIG. 2 is a sectional view of FIG. 1, as viewed in a direction of the arrow II.

In the rotation sensor 1 of the first embodiment, a magnetic detection section 7 is entirely covered with an internal filling resin 8 in an internal space of a case 2 with a closed end, which has a circular sectional shape. Above the magnetic detection section 7, a spacer 13 is provided on one side of the pair of lead frames 3X and 3Y. The pair of lead frames 3X and 3Y is covered with an exterior resin 9 on another side.

The case 2, the exterior resin 9, and the spacer 13 are made of a polyphenylenesulfide (PPS) resin or a polybutylene terephthalate (PBT) resin. The internal filling resin 8 is an epoxy resin.

The remaining configuration is the same as that of the related-art rotation sensor 1 illustrated in FIG. 44.

In the rotation sensor 1 according to the first embodiment, the lead frames 3X and 3Y are interposed between the spacer 13 and the exterior resin 9. As compared with the related-art rotation sensor 1 in which the internal filling resin 8 is provided around the lead frames 3X and 3Y, the amount of the internal filling resin 8 can be significantly reduced.

As a result, the amount of use of the internal filling resin 8 that is an expensive epoxy resin can be significantly reduced. Thus, manufacturing costs can be lowered.

Further, when inserting the magnetic detection section 7 into the case 2, the magnetic detection section 7 is inserted into the case 2 with the lead frames 3X and 3Y being fixed to the spacer 13. As a result, deformation of the lead frames 3X and 3Y is reduced to improve workability.

Second Embodiment

Figure 3:
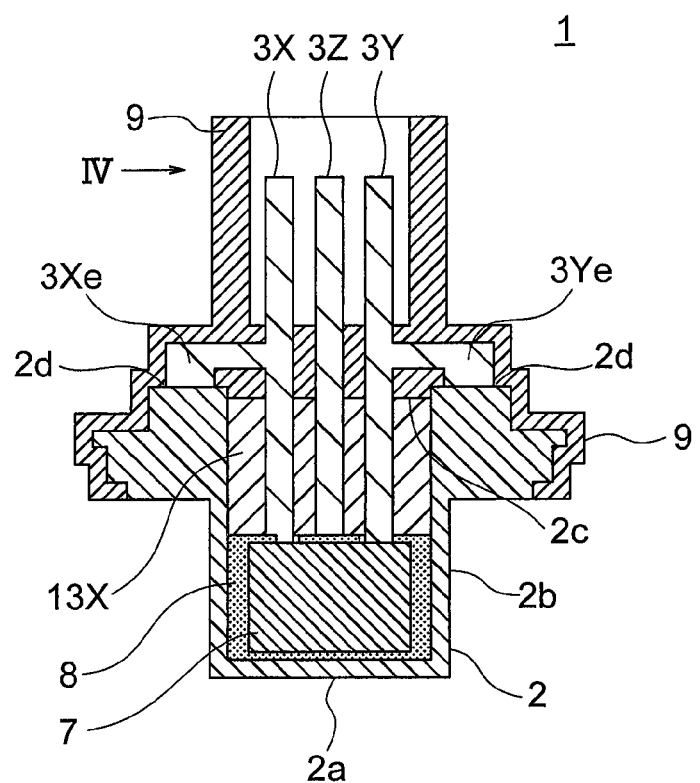
FIG. 3 is a front sectional view illustrating a rotation sensor according to a second embodiment of the present invention.
Figure 4:
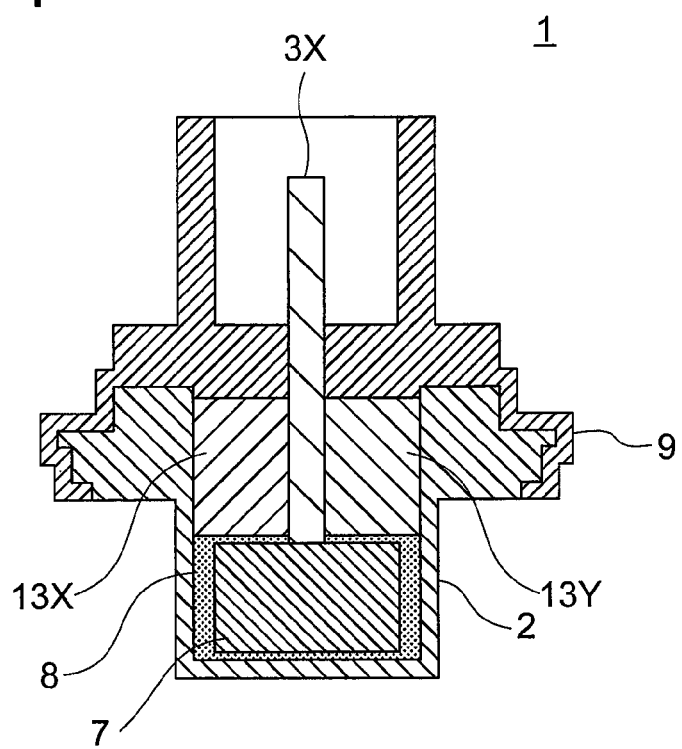
FIG. 4 is a sectional view of FIG. 3, as viewed in a direction of the arrow IV.

FIG. 3 is a front sectional view illustrating a rotation sensor 1 according to a second embodiment of the present invention, and FIG. 4 is a sectional view of FIG. 3, as viewed in a direction of the arrow IV.

The rotation sensor 1 of the second embodiments includes three lead frames 3X, 3Y, and 3Z. Among the three lead frames 3X, 3Y, and 3Z, a positioning portion 3Xe of the lead frame 3X and a positioning portion 3Ye of the lead frame 3Y are held in contact with an opening circumferential edge portion 2d of the case 2. As a result, a height position of the magnetic detection section 7 inside the case 2 is determined.

The lead frames 3X, 3Y, and 3Z are interposed between spacers 13X and 13Y so as to be opposed to each other. Each of the spacers 13X and 13Y has a semi-cylindrical shape obtained by cutting a cylinder along an axial direction. Each of the spacers 13X and 13Y is held in surface contact with an inner wall surface of a side surface portion 2b of the case 2.

Also in the rotation sensor 1 of the second embodiment, the amount of the internal filling resin 8 can be reduced. As a result, the manufacturing costs are reduced.

Further, when inserting the magnetic detection section 7 into the case 2, the magnetic detection section 7 is inserted into the case 2 so that the lead frames 3X, 3Y, and 3Z are interposed between the spacers 13X and 13Y. As a result, as compared with the rotation sensor 1 of the first embodiment, the deformation of the lead frames 3X, 3Y, and 3Z is further reduced to further improve the workability.

Third Embodiment

Figure 5:
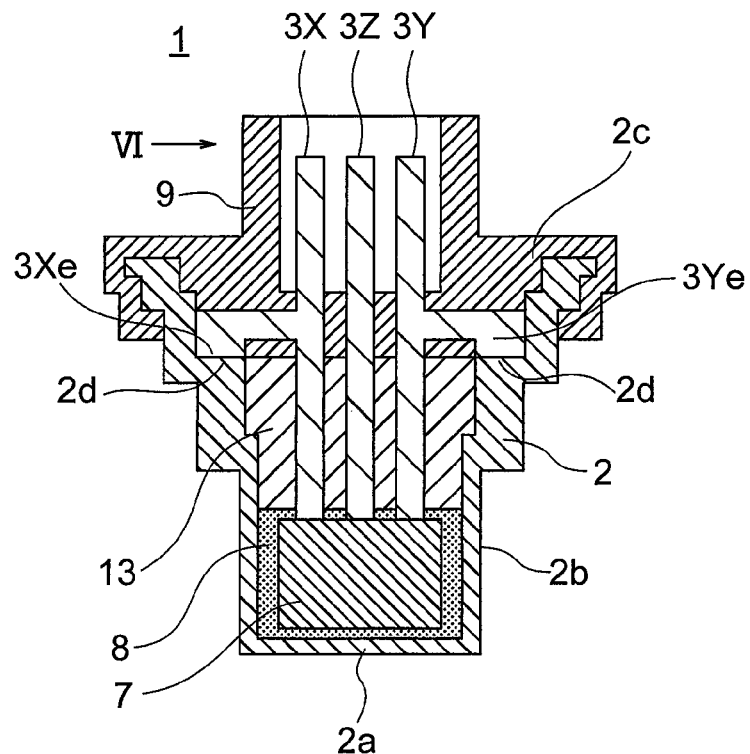
FIG. 5 is a front sectional view illustrating a rotation sensor according to a third embodiment of the present invention.
Figure 6:
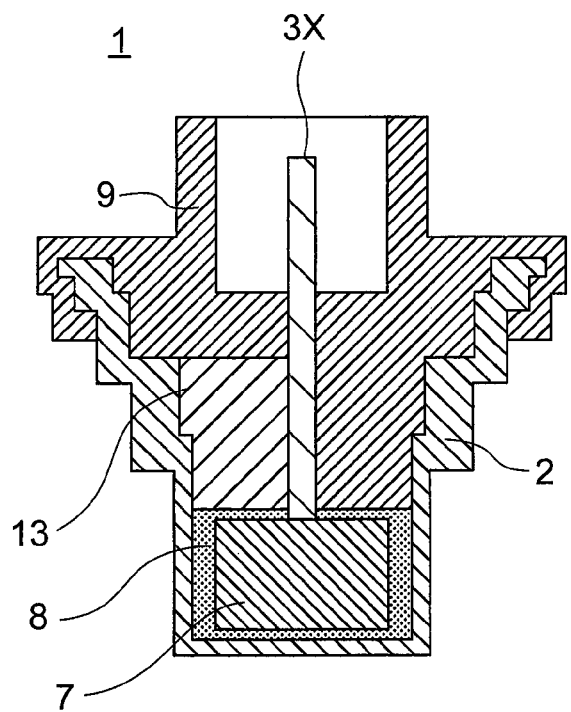
FIG. 6 is a sectional view of FIG. 5, as viewed in a direction of the arrow VI.

FIG. 5 is a front sectional view illustrating a rotation sensor 1 according to a third embodiment of the present invention, and FIG. 6 is a sectional view of FIG. 5, as viewed in a direction of the arrow VI.

In the rotation sensor 1 of the third embodiment, the opening circumferential edge portion 2d of the case 2, with which the positioning portion 3Xe of the lead frame 3X and the positioning portion 3Ye of the lead frame 3Y in the height direction are held in contact, is provided closer to a bottom surface portion 2a than an opening 2c of the case 2, as compared with the rotation sensors 1 of the first and second embodiments.

Therefore, at the time when the magnetic detection section 7 is buried with the internal filling resin 8 inside the case 2, a dimension E (not shown) from a contact surface between the opening circumferential edge portion 2d of the case 2 and the positioning portions 3Xe and 3Ye to an integrated circuit (IC) 4 of the magnetic detection section 7 mounted to the lead frames 3X, 3Y, and 3Z is determined with high accuracy.

Specifically, an insertion depth dimension of the lead frames 3X, 3Y, and 3Z and the magnetic detection section 7 (IC 4) in the case 2 is kept to the predetermined dimension by the positioning portions 3Xe and 3Ye. In this state, the lead frames 3X, 3Y, and 3Z and the magnetic detection section 7 are fixed with the internal filling resin 8.

Fourth Embodiment

Figure 7:
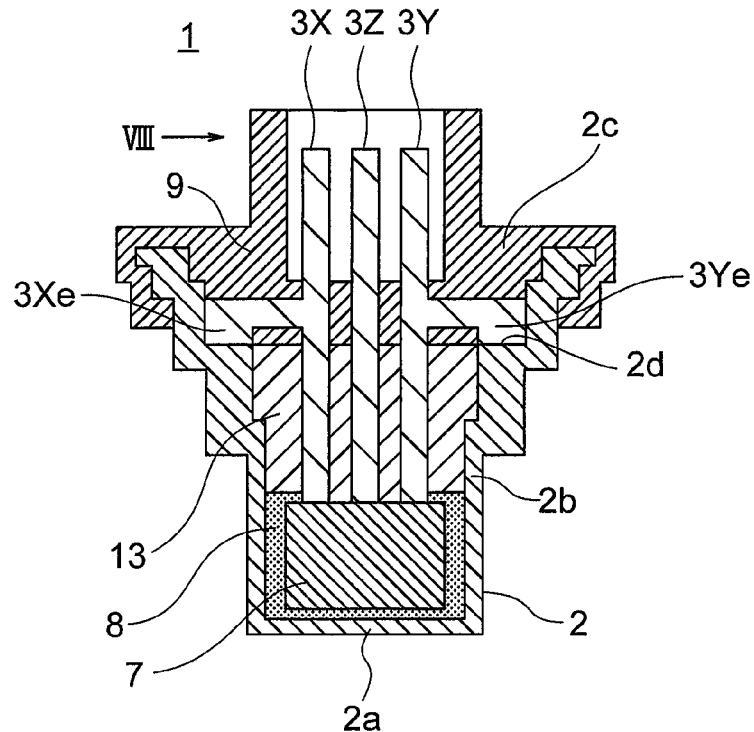
FIG. 7 is a front sectional view illustrating a rotation sensor according to a fourth embodiment of the present invention.
Figure 8:
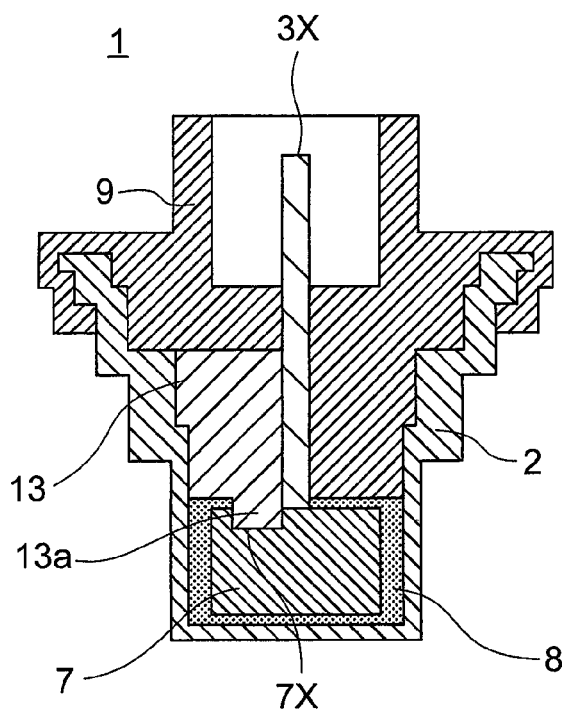
FIG. 8 is a sectional view of FIG. 7, as viewed in a direction of the arrow VIII.

FIG. 7 is a front sectional view illustrating a rotation sensor 1 according to a fourth embodiment of the present invention, and FIG. 8 is a sectional view of FIG. 7, as viewed in a direction of the arrow VIII.

The rotation sensor 1 of the fourth embodiment, fitting means for fitting the spacer 13 and the magnetic detection section 7 to each other is provided to the spacer 13 and the magnetic detection section 7.

The fitting means includes a fitting portion 7X formed on the magnetic detection section 7 and a magnetic detection section supporting portion 13a having a convex shape to be fitted into the fitting portion 7X.

The remaining configuration is the same as that of the rotation sensor 1 of the third embodiment.

In the rotation sensor 1 of the fourth embodiment, the spacer 13 supports the magnetic detection section 7 together with the lead frames 3X, 3Y, and 3Z by the fitting of the magnetic detection section supporting portion 13a of the spacer 13 into the fitting portion 7X. Thus, the deformation of the lead frames 3X, 3Y, and 3Z is further reduced when the magnetic detection section 7 is inserted into the case 2. As a result, the magnetic detection section 7 is installed in a predetermined position with high accuracy.

Fifth Embodiment

Figure 9:
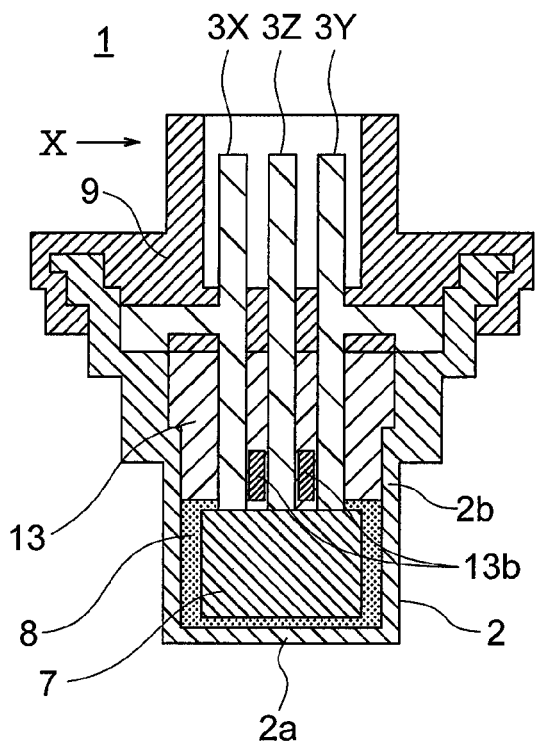
FIG. 9 is a front sectional view illustrating a rotation sensor according to a fifth embodiment of the present invention.
Figure 10:
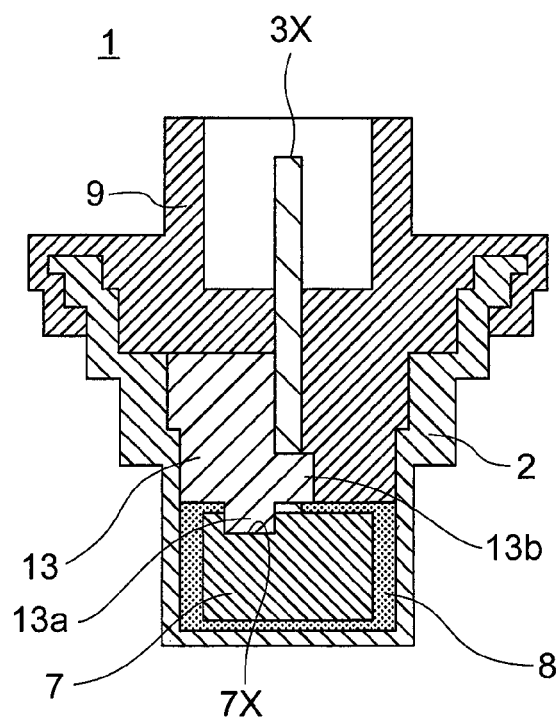
FIG. 10 is a sectional view of FIG. 9, as viewed in a direction of the arrow X.

FIG. 9 is a front sectional view illustrating a rotation sensor 1 according to a fifth embodiment of the present invention, and FIG. 10 is a sectional view of FIG. 9, as viewed in a direction of the arrow X.

In the rotation sensor 1 of the fifth embodiment, ribs 13b are provided on a plane portion of the spacer 13 having a semi-circular sectional shape so as to be located close to the magnetic detection section 7. The ribs 13b having distal ends extend into gaps between the adjacent lead frames 3X, 3Y, and 3Z.

The remaining configuration is the same as that of the rotation sensor 1 of the fourth embodiment.

In the rotation sensor 1 of the fifth embodiment, the ribs 13b are provided in the gaps between the adjacent lead frames 3X, 3Y, and 3Z. Thus, the ribs 13b function as partition walls so that electrical short-circuit is prevented from occurring between the lead frames 3X, 3Y, and 3Z when the lead frames 3X, 3Y, and 3Z are deformed.

Sixth Embodiment

Figure 11:
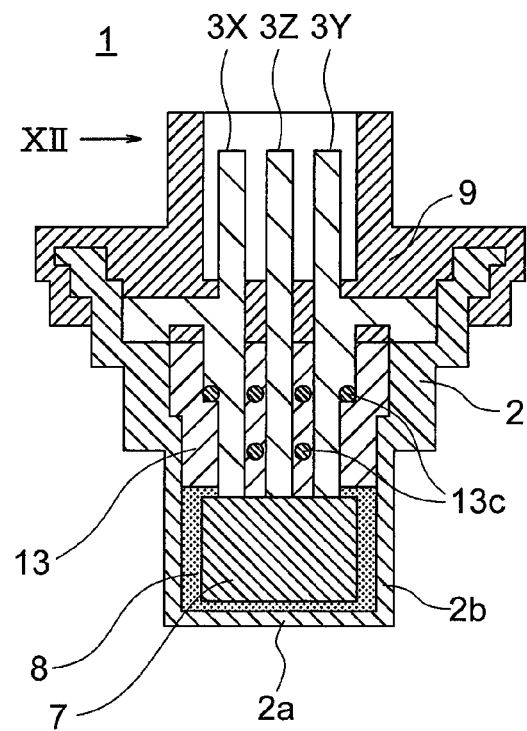
FIG. 11 is a front sectional view illustrating a rotation sensor according to a sixth embodiment of the present invention.
Figure 12:
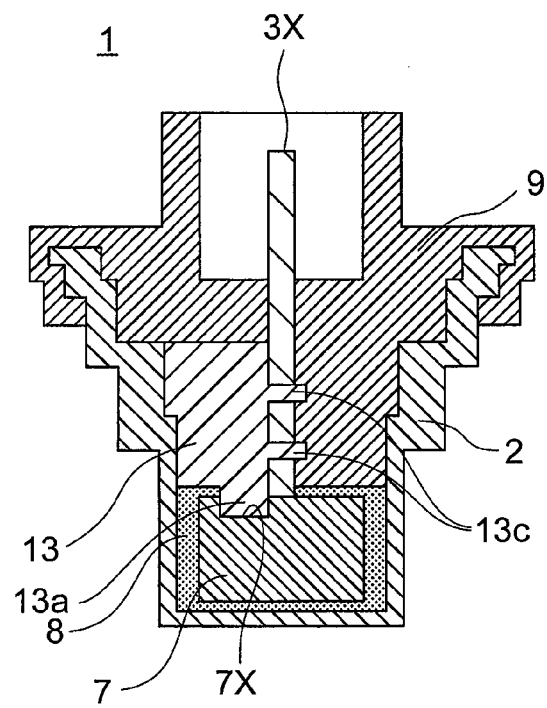
FIG. 12 is a sectional view of FIG. 11, as viewed in a direction of the arrow XII.

FIG. 11 is a front sectional view illustrating a rotation sensor 1 according to a sixth embodiment of the present invention, and FIG. 12 is a sectional view of FIG. 11, as viewed in a direction of the arrow XII.

In the rotation sensor 1 of the sixth embodiment, positioning pins 13c are provided to a plane portion of the spacer 13 having a semi-circular sectional shape. Positioning pins 13c are provided so as to interpose the lead frames 3X, 3Y, and 3Z and be held in contact with both end surfaces of the lead frames 3X, 3Y, and 3Z, respectively.

The remaining configuration is the same as that of the rotation sensor 1 of the fourth embodiment.

In the case of the rotation sensor 1 of the sixth embodiment, the electrical short-circuit can be prevented from occurring between the lead frames 3X, 3Y, and 3Z by the positioning pins 13c when the lead frames 3X, 3Y, and 3Z are deformed, as in the case of the rotation sensor 1 of the fifth embodiment.

Seventh Embodiment

Figure 13:
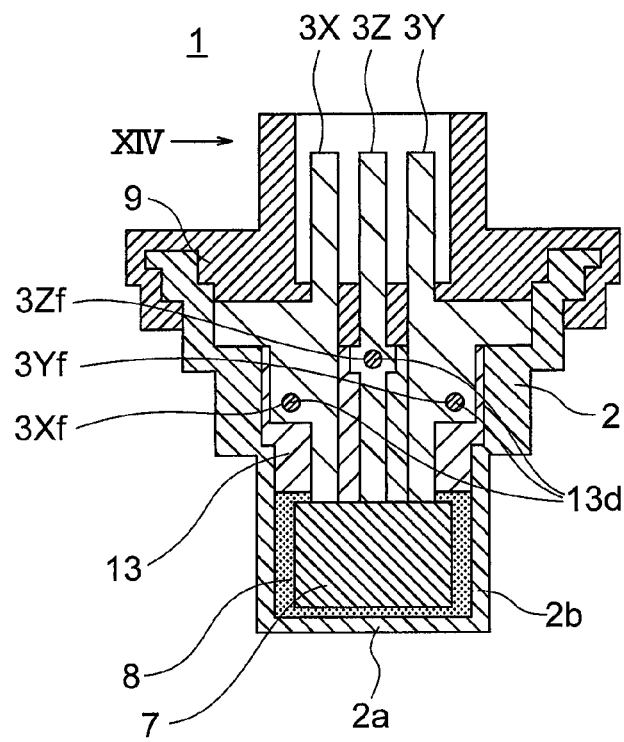
FIG. 13 is a front sectional view illustrating a rotation sensor according to a seventh embodiment of the present invention.
Figure 14:
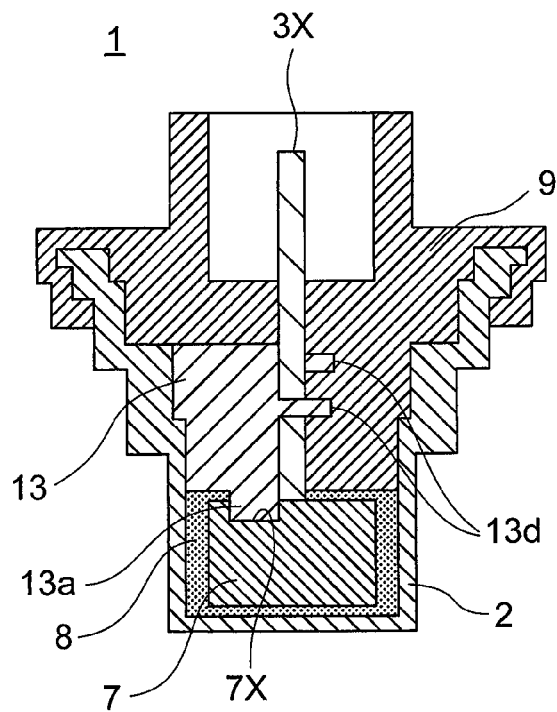
FIG. 14 is a sectional view of FIG. 13, as viewed in a direction of the arrow XIV.

FIG. 13 is a front sectional view illustrating a rotation sensor 1 according to a seventh embodiment of the present invention, and FIG. 14 is a sectional view of FIG. 13, as viewed in a direction of the arrow XIV.

In the rotation sensor 1 of the seventh embodiment, positioning holes 3Xf, 3Zf, and 3Yf are respectively formed in the lead frames 3X, 3Y, and 3Z. Positioning pins 13d are provided to a plane portion of the spacer 13 having a semi-circular sectional shape so as to be respectively opposed to the positioning holes 3Xf, 3Zf, and 3Yz.

The remaining configuration is the same as that of the rotation sensor 1 of the fourth embodiment.

According to the rotation sensor 1 of the seventh embodiment, the positioning pins 13d are pressed into the positioning holes 3Xf, 3Zf, and 3Yf of the lead frames 3X, 3Y, and 3Z, thereby integrating the lead frames 3X, 3Y, and 3Z with the spacer 13. As a result, the deformation of the lead frames 3X, 3Y, and 3Z is reduced when the magnetic detection section 7 is inserted into the case 2. As a result, the magnetic detection section 7 is installed in a predetermined position with higher accuracy.

Eighth Embodiment

Figure 15:
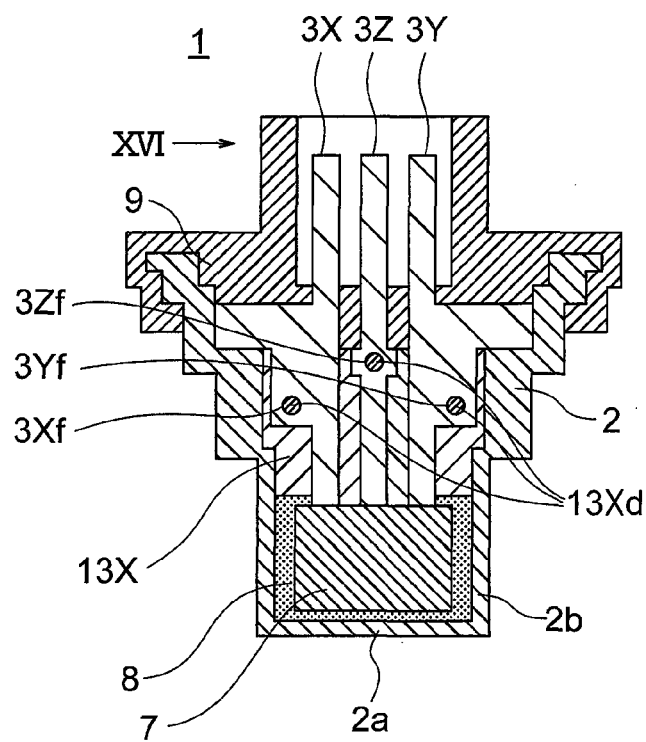
FIG. 15 is a front sectional view illustrating a rotation sensor according to an eighth embodiment of the present invention.
Figure 16:
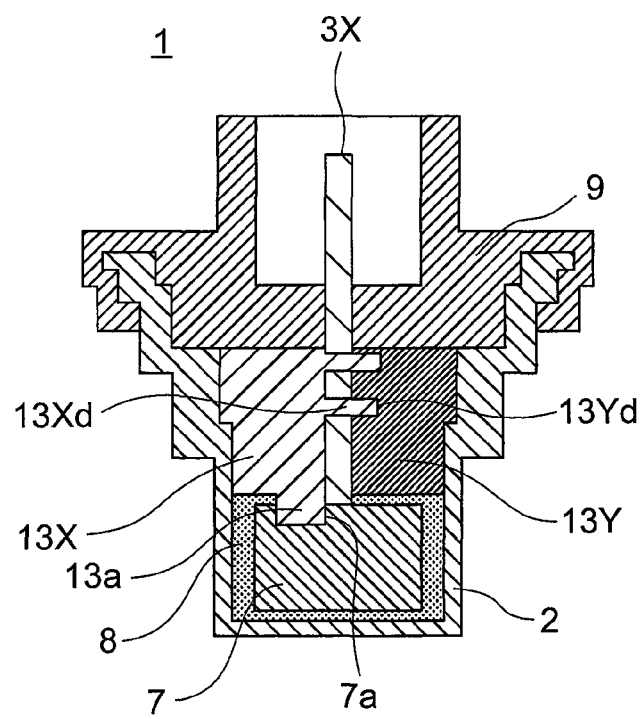
FIG. 16 is a sectional view of FIG. 15, as viewed in a direction of the arrow XVI.

FIG. 15 is a front sectional view illustrating a rotation sensor 1 according to an eighth embodiment of the present invention, and FIG. 16 is a sectional view of FIG. 15, as viewed in a direction of the arrow XVI.

In the rotation sensor 1 of the eighth embodiment, the lead frames 3X, 3Y, and 3Z are interposed between the spacers 13X and 13Y. Each of the spacers 13X and 13Y has a semi-cylindrical shape obtained by cutting a cylinder along the axial direction. The spacers 13X and 13Y are held in surface contact with the inner wall surface of the side surface portion 2b of the case 2, which has a circular sectional shape.

Three positioning pins 13Xd are provided to the spacer 13X. Positioning holes 13Yd are formed in the spacer 13Y so as to be opposed to the positioning pins 13Xd.

The positioning holes 3Xf, 3Yf, and 3Zf are respectively formed through the lead frames 3X, 3Y, and 3Z.

When the lead frames 3X, 3Y, and 3Z are interposed between the spacers 13X and 13Y, the positioning pins 13Xd of the spacer 13X are respectively fitted into the positioning holes 13Yd of the spacer 13Y through the positioning holes 3Xf, 3Yf, and 3Zf of the lead frames 3X, 3Y, and 3Z.

The remaining configuration is the same as that of the rotation sensor 1 of the fourth embodiment.

In the rotation sensor 1 of the eighth embodiment, the lead frames 3X, 3Y, and 3Z are interposed between the spacers 13X and 13Y and are integrated with the spacers 13X and 13Y.

Figure 27:
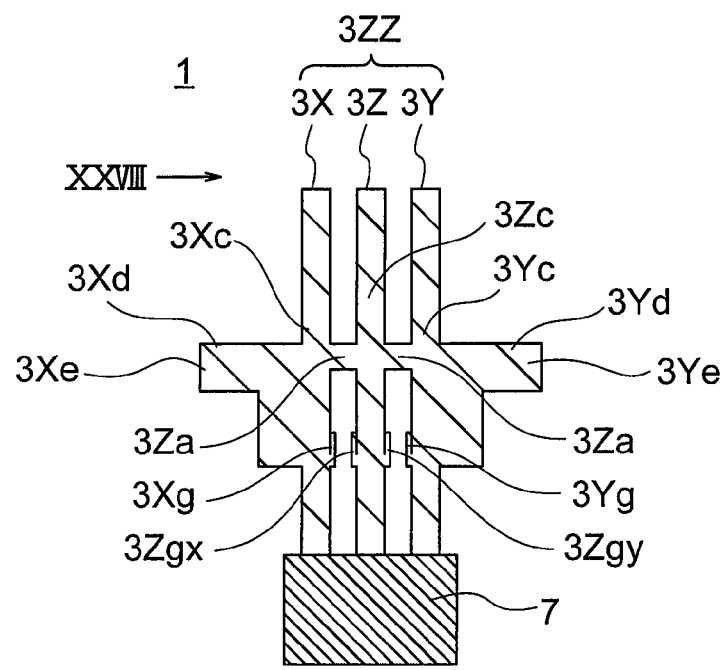
FIG. 27 is an explanatory view explaining a first step of manufacturing process of a rotation sensor according to a ninth embodiment (FIG. 17) of the present invention.

Therefore, as illustrated in FIG. 27, the lead frames 3X, 3Y, and 3Z are formed by cutting coupling portions 3Za of a lead-frame coupled body 3ZZ. The coupling portions 3Za can be cut in the integrated state described above.

Specifically, in an assembly step for the rotation sensor 1, when the lead frames 3X, 3Y, and 3Z are assembled to the spacer 13X, the lead frames 3X, 3Y, and 3Z connected through the coupling portions 3Za are first assembled to the spacer 13X as a single component. Thereafter, the coupling portions 3Za are cut. In this manner, productivity is significantly improved.

Further, a semi-product, in which the lead frames 3X, 3Y, and 3Z are interposed between the spacers 13X and 13Y so as to integrate the lead frames 3X, 3Y, and 3Z, the spacers 13X and 13Y, and the magnetic detection section 7 with each other, can be handled as a single component. Thus, handling properties are improved in assembly. At the same time, the deformation of the lead frames 3X, 3Y, and 3Z is reduced. As a result, the magnetic detection section 7 is installed in a predetermined position with higher accuracy.

Ninth Embodiment

Figure 17:
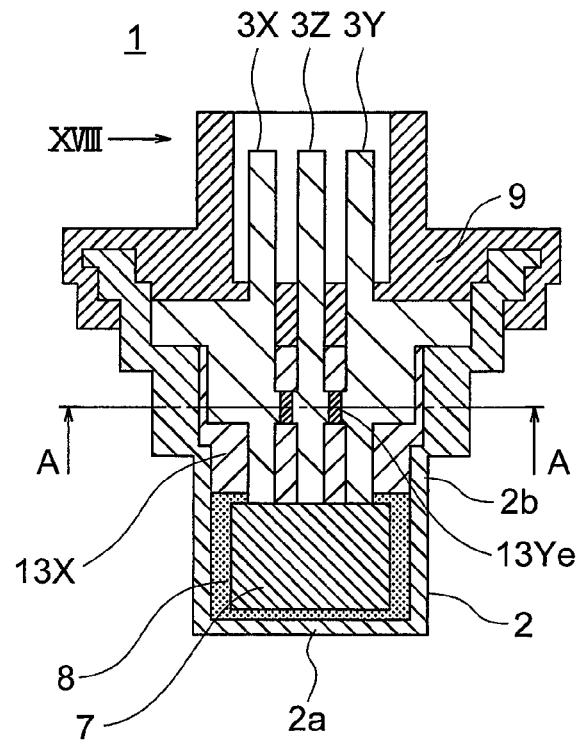
FIG. 17 is a front sectional view illustrating a rotation sensor 1 according to a ninth embodiment of the present invention.
Figure 18:
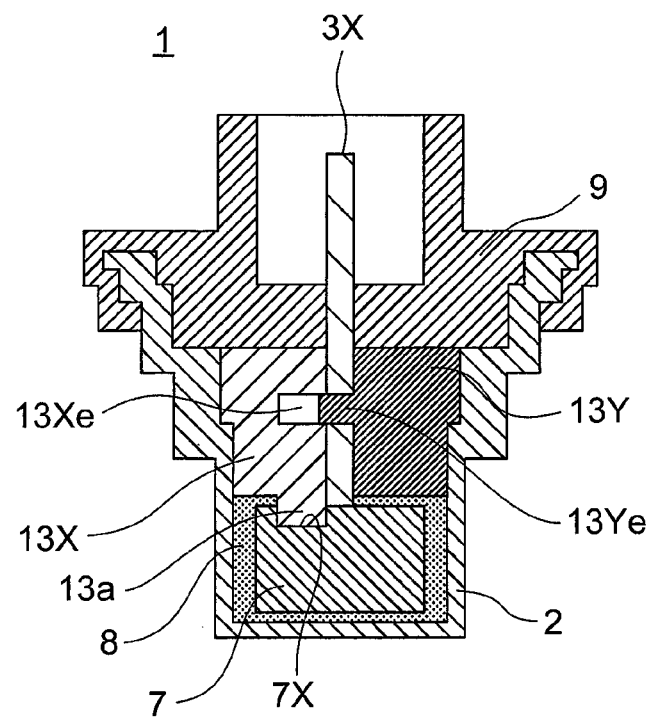
FIG. 18 is a sectional view of FIG. 17, as viewed in a direction of the arrow XVIII.
Figure 19:
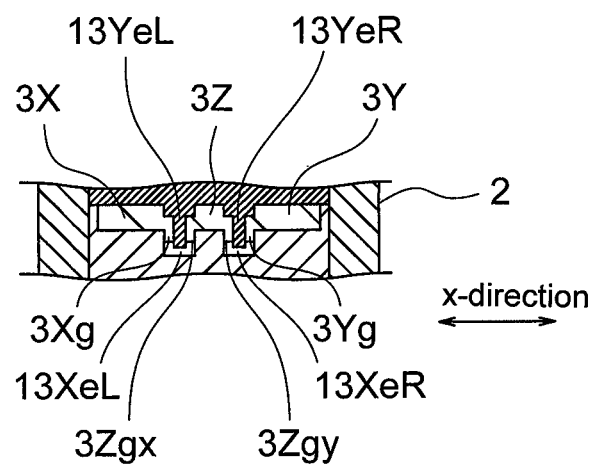
FIG. 19 is a sectional view taken along the line A-A in FIG. 17, as viewed in a direction of the arrows.

FIG. 17 is a front sectional view illustrating a rotation sensor 1 according to a ninth embodiment of the present invention, FIG. 18 is a sectional view of FIG. 17 as viewed in a direction of the arrow XVIII, and FIG. 19 is a sectional view taken along the line A-A in FIG. 17, as viewed in a direction of the arrows.

In the rotation sensor 1 of the ninth embodiment, spacer concave-side fitting portions 13XeL and 13XeR are formed on the spacer 13X. Spacer convex-side fitting portions 13YeL and 13YeR to be fitted into the spacer convex-side fitting portions 13XeL and 13XeR are formed on the spacer 13Y.

The letter "L" in the reference symbols 13XeL, 13XeR, 13YeL, and 13YeR indicates the spacer concave-side fitting portion and the spacer convex-side fitting portion that are provided on the left in FIG. 19, whereas the letter "R" indicates the spacer concave-side fitting portion and the spacer convex-side fitting portion that are provided on the right.

A lead-frame interposing portion 3Xg, which is provided on the side closer to the adjacent lead frame 3Z so as to project toward the spacer 13X, is formed on the lead frame 3X. A lead-frame interposing portion 3Yg, which is provided on the side closer to the adjacent lead frame 3Z so as to project toward the spacer 13X, is formed on the lead frame 3Y. Lead-frame interposing portions 3Zgx and 3Zgy are formed on the spacer 3Z so as to project toward the spacer 13X. The lead-frame interposing portion 3Zgx is provided on the side closer to the adjacent lead frame 3X, whereas the lead-frame interposing portion 3Zgy is provided on the side closer to the adjacent lead frame 3Y.

When the lead frames 3X, 3Y, and 3Z are interposed between the spacers 13X and 13Y, the spacer convex-side fitting portions 13YeL and 13YeR are fitted into the spacer concave-side fitting portions 13XeL and 13XeR through the lead-frame interposing portions 3Xg, 3Yg, 3Zgx, and 3Zgy. In this manner, the lead frames 3X, 3Y, and 3Z are integrated with the spacers 13X and 13Y.

The remaining configuration is the same as that of the rotation sensor 1 of the fourth embodiment.

In an x-direction in FIG. 19, the following expression is satisfied for dimensions of the spacer concave-side fitting portion 13XeL, the lead-frame interposing portion 3Xg, the spacer convex-side fitting portion 13YeL, and the lead-frame interposing portion 3Zgx.

$$13XeL \geq 3Xg + 13YeL + 3ZgX$$

Further, similarly, the following expression is satisfied for dimensions of the spacer concave-side fitting portion 13XeR, the lead-frame interposing portion 3Yg, the spacer concave-side fitting portion 13XeR, and the lead-frame interposing portion 3Zgy.

$$13XeR \geq 3Yg + 13XeR + 3Zgy$$

According to the rotation sensor 1 of the ninth embodiment, a semi-product, in which the lead frames 3X, 3Y, and 3Z are interposed between the spacers 13X and 13Y so as to integrate the lead frames 3X, 3Y, and 3Z, the spacers 13X and 13Y, and the magnetic detection section 7 with each other, can be handled as a single component as in the case of the rotation sensor 1 of the eighth embodiment. Thus, the handling properties are improved in assembly. At the same time, the deformation of the lead frames 3X, 3Y, and 3Z is reduced. As a result, the magnetic detection section 7 is installed in a predetermined position with higher accuracy.

Further, after the lead frames 3X, 3Y, and 3Z are assembled to the spacer 13X or 13Y in a state in which the adjacent lead frames 3X, 3Y, and 3Z are connected in advance through connecting portions (not shown) for the lead-frame interposing portions 3Xg, 3Zgx, 3Zgy, and 3Yg as a single component, the connecting portions are cut. In this manner, the productivity can also be improved.

Tenth Embodiment

Figure 20:
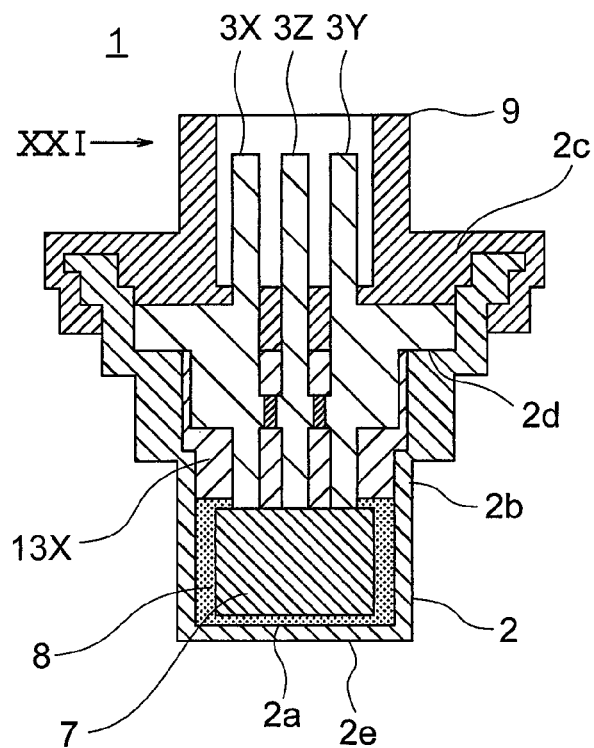
FIG. 20 is a front sectional view illustrating a rotation sensor according to a tenth embodiment of the present invention.
Figure 21:
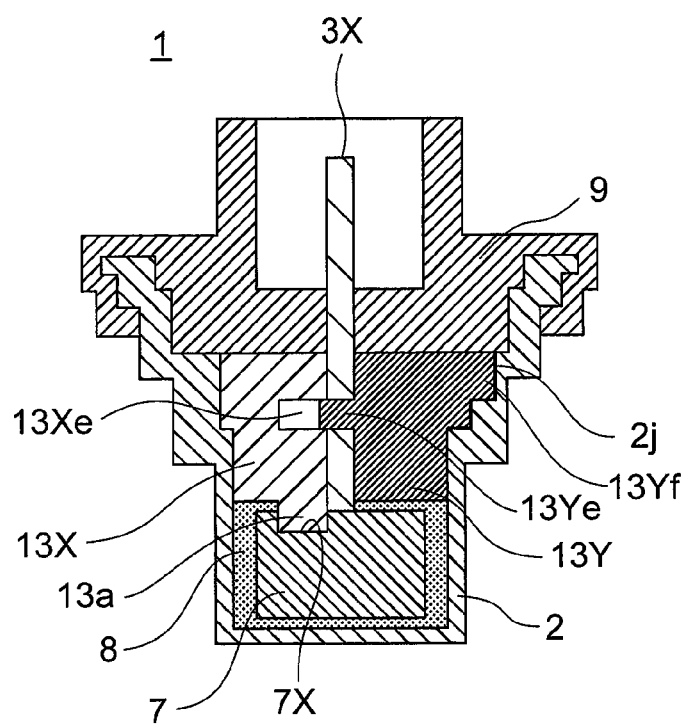
FIG. 21 is a sectional view of FIG. 20, as viewed in a direction of the arrow XXI.

FIG. 20 is a front sectional view illustrating a rotation sensor 1 according to a tenth embodiment of the present invention, and FIG. 21 is a sectional view of FIG. 20, as viewed in a direction of the arrow XXI.

In the rotation sensor 1 of the tenth embodiment, positional alignment portions for positional alignment between the case 2 and the spacer 13Y are provided between the case 2 and the spacer 13Y.

The positional alignment portions include a positional alignment convex portion 13Yf and a positional alignment concave portion 2j. The positional alignment convex portion 13Yf is provided to a portion of an upper outer circumferential portion of the spacer 13Y so as to project radially outward. The positional alignment concave portion 2j, into which the positional alignment convex portion 13Yf is fitted, is formed on the side surface portion 2b of the case 2.

The remaining configuration is the same as that of the rotation sensor 1 of the ninth embodiment.

According to the rotation sensor 1 of this embodiment, even when the inner wall of the case 2 has a cylindrical shape and the lead frames 3X, 3Y, and 3Z are located in the center of the case 2, a direction of assembly of the magnetic detection section 7 is automatically determined by fitting the positional alignment convex portion 13Yf into the positional alignment concave portion 2j of the case 2 when the semi-product, in which the lead frames 3X, 3Y, and 3Z are interposed between the spacers 13X and 13Y so as to be integrated with each other, is assembled into the case 2.

Alternatively, as illustrated in FIG. 22, the positional alignment convex portion 2j may be formed on the case 2, while the positional alignment concave portion 13Yf, into which the positional alignment convex portion 2j is to be fitted, may be formed on the spacer 13Y.

Eleventh Embodiment

Figure 23:
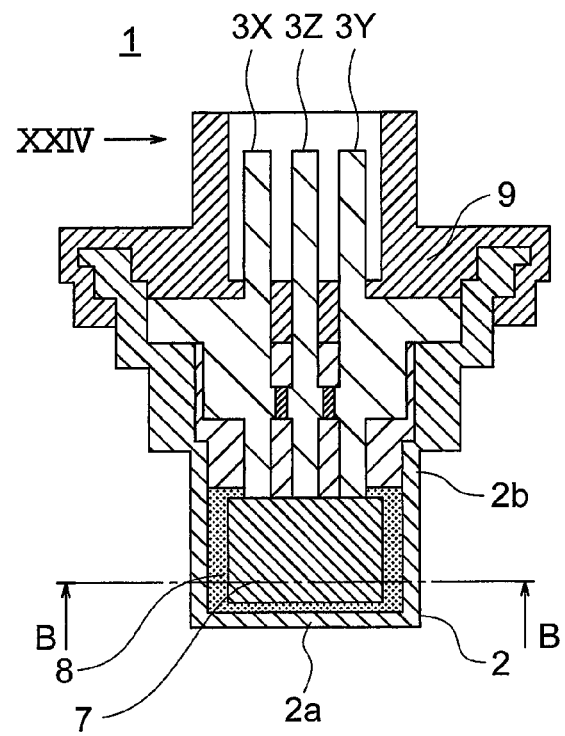
FIG. 23 is a front sectional view illustrating a rotation sensor according to an eleventh embodiment of the present invention.
Figure 24:
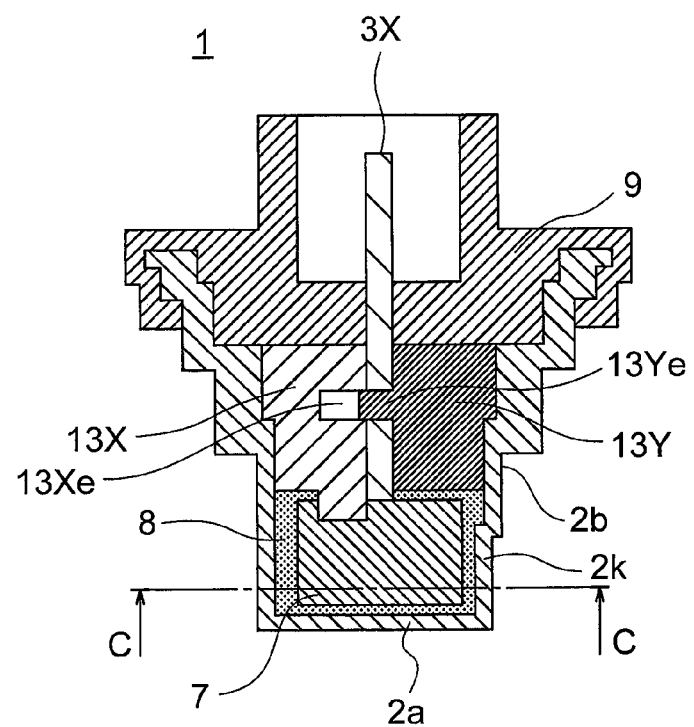
FIG. 24 is a sectional view of FIG. 23 as viewed in a direction of the arrow XXIV.

FIG. 23 is a front sectional view illustrating a rotation sensor 1 according to an eleventh embodiment of the present invention, FIG. 24 is a sectional view of FIG. 23 as viewed in a direction of the arrow XXIV, FIG. 25 is a sectional view taken along the line B-B in FIG. 23, as viewed in a direction of the arrows, and FIG. 26 is a sectional view taken along the line C-C in FIG. 24, as viewed in a direction of the arrows.

In the rotation sensor 1 of the eleventh embodiment, the magnetic detection section 7 has a "D"-like sectional shape and includes a cut portion 7a. The case 2 includes a cut portion 2k so as to correspond to the shape of the magnetic detection section 7.

The remaining configuration is the same as that of the rotation sensor 1 of the ninth embodiment.

According to the rotation sensor 1 of the eleventh embodiment, the magnetic detection section 7 has an asymmetrical shape having directionality. The case 2 also has an asymmetrical shape so as to correspond to the shape of the magnetic detection section 7. Therefore, when the magnetic detection section 7 is mounted into the case 2, a direction of assembly is defined.

Further, in an assembly step for the rotation sensor 1, when the case 2 in which the semi-product is housed is placed inside a die for forming the exterior resin 9, the direction of assembly of the case 2 can be defined by visual observation. Thus, the workability is improved.

Next, first to fourth steps for manufacturing the rotation sensor 1 of the ninth embodiment, which is illustrated in FIGS. 17 to 19, are described in order.

The steps until the completion of the magnetic detection section 7, which is connected to an end of the lead-frame coupled body 3ZZ made of a metal plate having a rectangular shape, are described in Japanese Patent Application Laid-open No. 2012-2564 referring to FIGS. 4 to 7, and therefore the description thereof is herein omitted.

First Step

Figure 28:
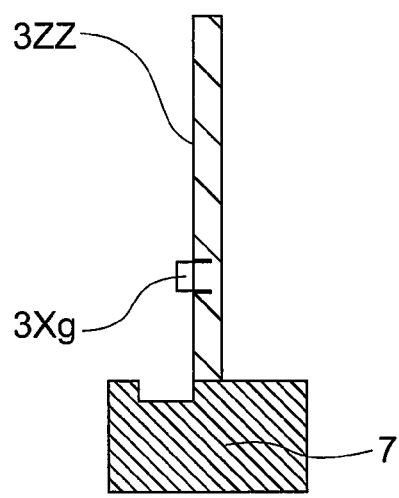
FIG. 28 is a sectional view of FIG. 27 as viewed in a direction of the arrow XXVIII.

FIG. 27 is a front view illustrating the lead-frame coupled body 3ZZ and the magnetic detection section 7 in the first step, and FIG. 28 is a sectional view of FIG. 27 as viewed in a direction of the arrow XXVIII.

In this step, the lead frames 3X, 3Y, and 3Z are components of the lead-frame coupled body 3ZZ in which the lead frames 3X, 3Y, and 3Z are connected by the coupling portions 3Za (at two positions). The magnetic detection section 7 is connected to the end of the lead-frame coupled body 3ZZ.

Second Step

Figure 29:
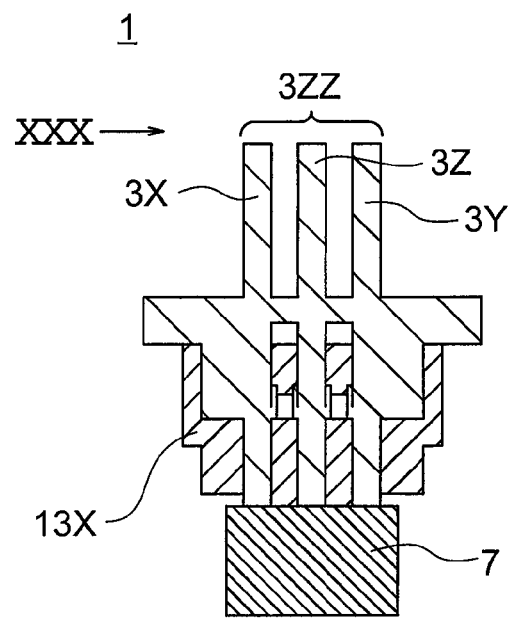
FIG. 29 is an explanatory view explaining a next step (a second step) of manufacturing process of a rotation sensor shown in FIG. 27.
Figure 30:
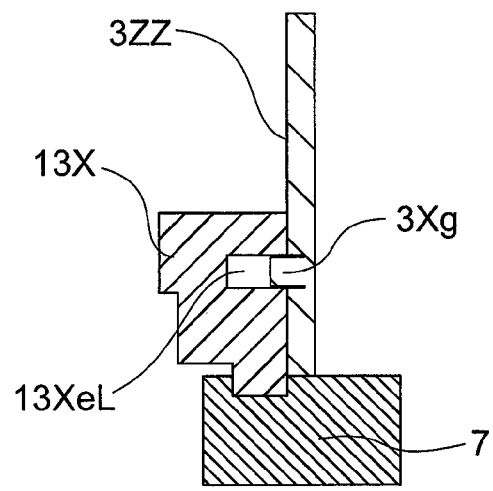
FIG. 30 is a sectional view of FIG. 29 as viewed in a direction of the arrow XXX.

FIG. 29 is a front view illustrating the lead-frame coupled body 3ZZ, the magnetic detection section 7, and the spacer 13X in the second step, and FIG. 30 is a sectional view of FIG. 29 as viewed in a direction of the arrow XXX.

The lead-frame interposing portions 3Xg, 3Zgx, 3Yg, and 3Zgy, which project from the lead-frame coupled body 3ZZ, are fitted into the two spacer concave-side fitting portions 13XeL and 13XeR provided to the spacer 13X so as to temporarily fix the lead-frame coupled body 3ZZ.

Figure 31:
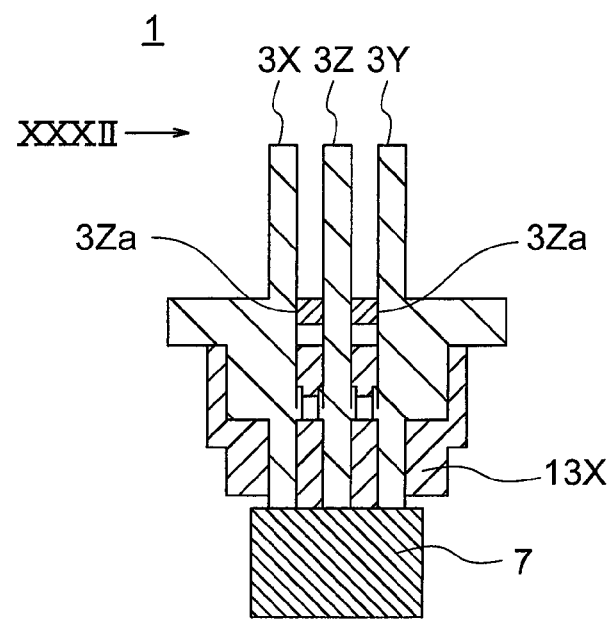
FIG. 31 is an explanatory view explaining a next step (a second step) of manufacturing process of a rotation sensor shown in FIG. 27.

The two coupling portions 3Za of the lead-frame coupled body 3ZZ illustrated in FIG. 31 are cut (cut off).

The cutting may be performed after the spacer 13Y is assembled to the spacer 13X.

Figure 32:
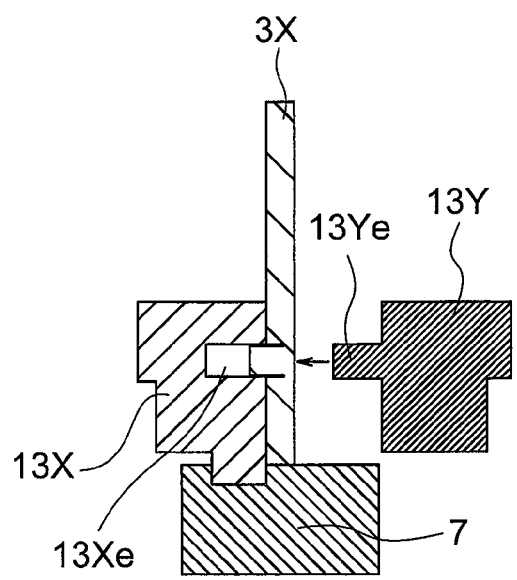
FIG. 32 is a sectional view of FIG. 31 as viewed in the direction of the arrow XXXII.

Next, as illustrated in FIG. 32 that is a sectional view of FIG. 31 as viewed in the direction of the arrow XXXII, the spacer 13Y is assembled to the lead frames 3X, 3Y, and 3Z.

Next, referring to FIGS. 33 to 36, a state of assembly of fitting portions of the spacers 13X and 13Y and the lead frames 3X, 3Y, and 3Z is sequentially described.

FIG. 33 illustrates fitting portions of the spacer 13X, the lead-frame coupled body 3ZZ, and the spacer 13Y.

FIG. 34 illustrates a state in which the spacer 13X and the lead-frame coupled body 3ZZ are fitted to each other so as to complete the temporary assembly.

Figure 35:
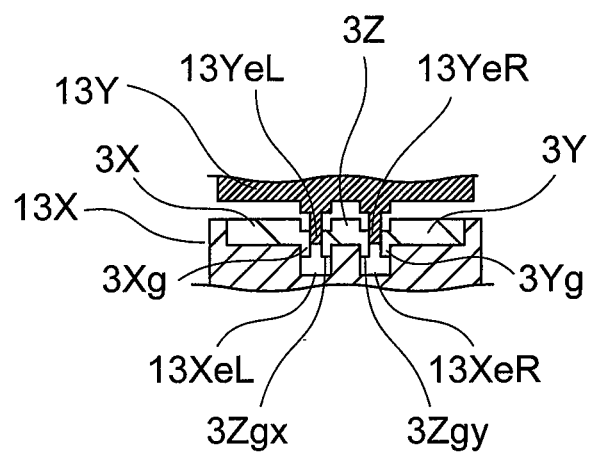
FIG. 35 is an explanatory view explaining a procedure assembling a spacer to a lead-frame in a second step.
Figure 36:
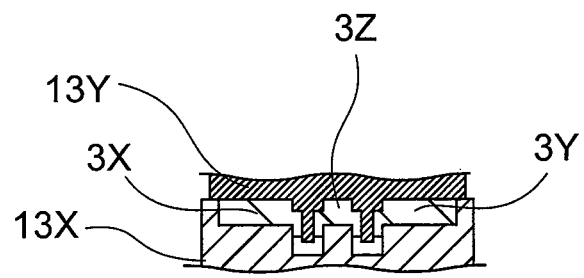
FIG. 36 is an explanatory view explaining a procedure assembling a spacer to a lead-frame in a second step.

FIG. 35 illustrates a subsequent state in which the spacer 13Y is being assembled to the lead-frame coupled body 3ZZ. FIG. 36 illustrates a state in which the assembly of the spacer 13X, the lead-frame coupled body 3ZZ, and the spacer 13Y is completed.

Figure 37:
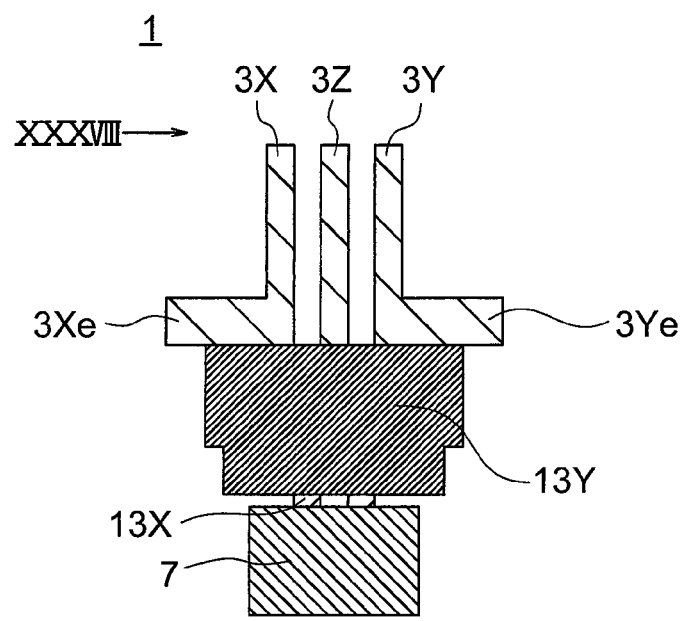
FIG. 37 is an explanatory view explaining a procedure assembling a spacer to a lead-frame in a second step.
Figure 38:
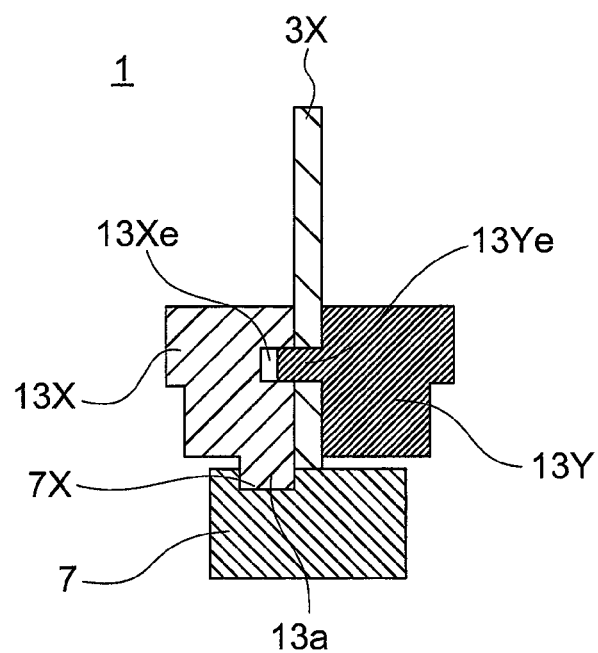
FIG. 38 is a sectional view of FIG. 37 as viewed in a direction of the arrow XXXVIII.

FIG. 37 is a front view illustrating a state in which the coupling portions 3Za are removed after the assembly of the spacer 13X, the lead-frame coupled body 3ZZ, and the spacer 13Y is completed. FIG. 38 is a sectional view of FIG. 37 as viewed in a direction of the arrow XXXVIII.

Third Step

Figure 39:
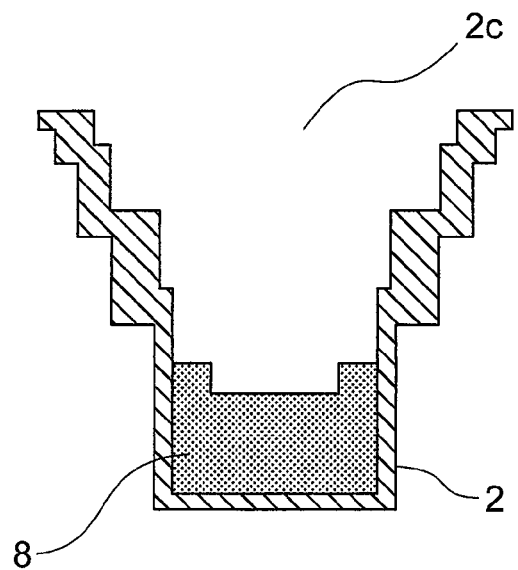
FIG. 39 is an explanatory view explaining a next step (a third step) of manufacturing process of a rotation sensor shown in FIG. 29.

Next, as illustrated in FIG. 39, the internal filling resin 8 that is a mold resin is filled into the internal space of the case 2.

Figure 40:
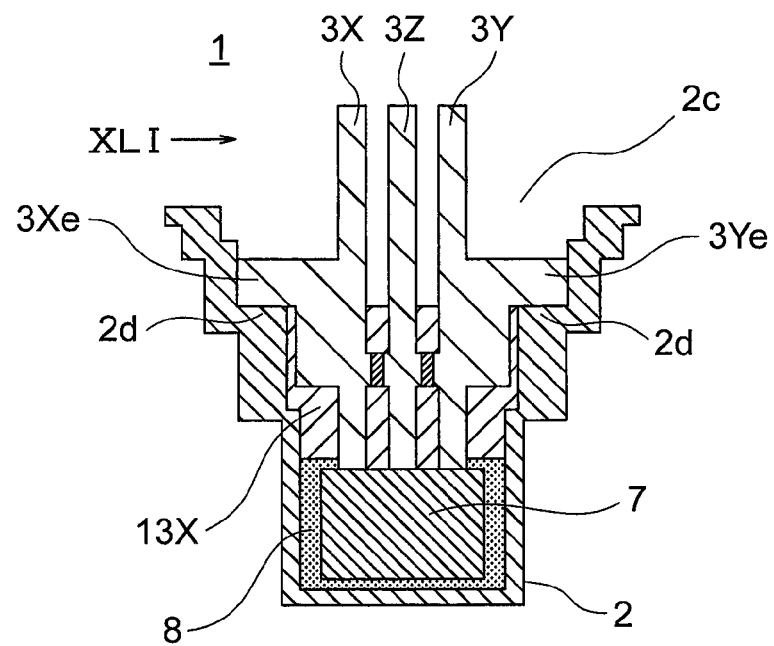
FIG. 40 is an explanatory view explaining a third step.
Figure 41:
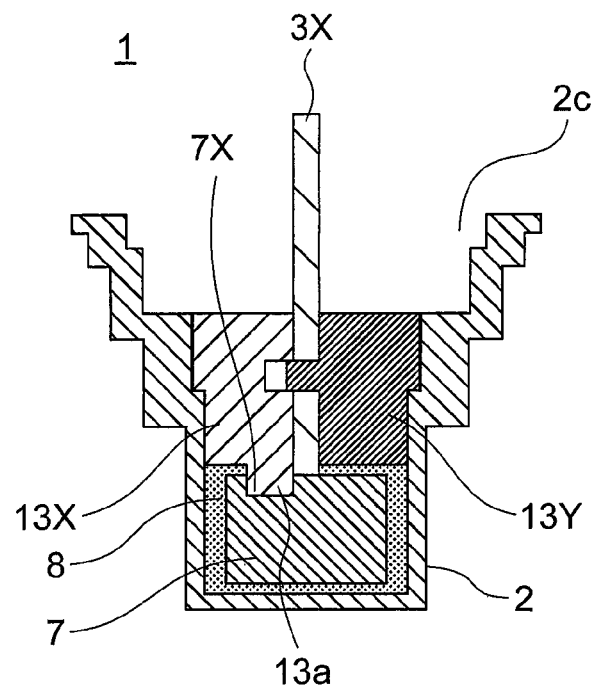
FIG. 41 is a sectional view of FIG. 40 as viewed in a direction of the arrow XLI.

Next, as illustrated in FIG. 40 and FIG. 41 that is a sectional view of FIG. 40 as viewed in a direction of the arrow XLI, the semi-product is inserted into the case 2. The positioning portions 3Xe and 3Ye are brought into contact with the opening circumferential edge portion 2d of the case 2. In a state in which the magnetic detection section 7 is housed in a predetermined position inside the case 2, the internal filing resin 8 is cured.

For the removal of the coupling portions 3Za from the lead-frame coupled body 3ZZ, the coupling portions 3Za can be removed in the third step. However, the cutting is already completed in the second step as described above. Therefore, the cutting work for the coupling portions 3Za in a position deeper than the opening 2c of the case 2 is not required.

Fourth Step

Figure 42:
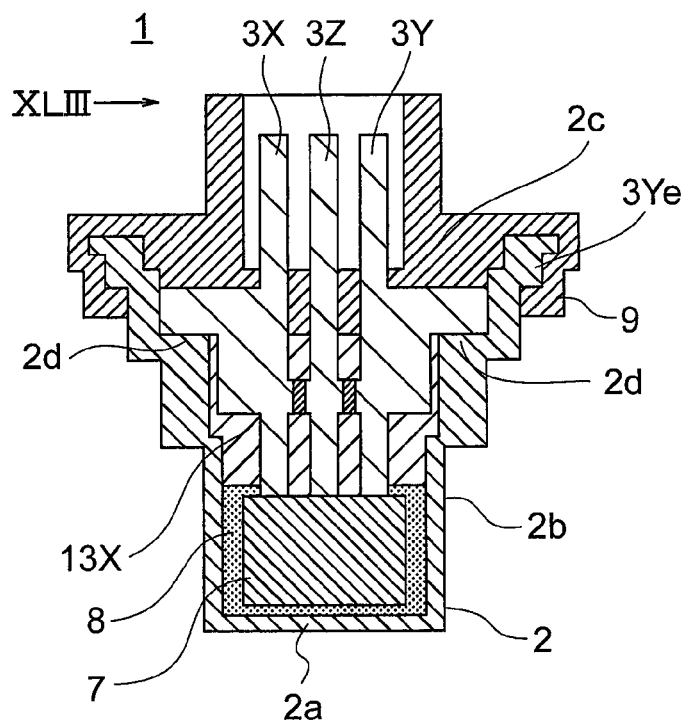
FIG. 42 is an explanatory view explaining a next step (a forth step) of manufacturing process of a rotation sensor shown in FIG. 39.
Figure 43:
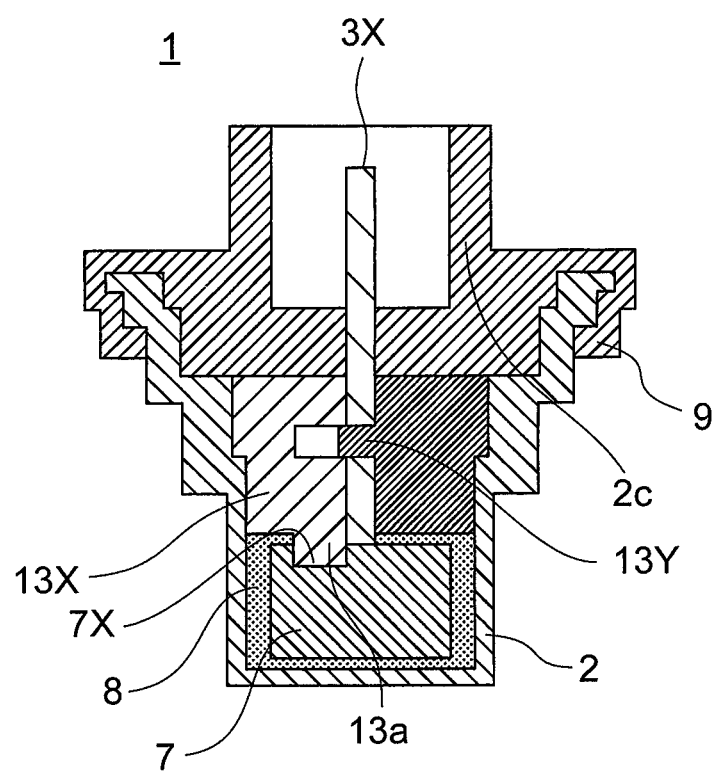
FIG. 43 is a sectional view of FIG. 42 as viewed in a direction of the arrow XLIII.

Next, as illustrated in FIG. 42 and FIG. 43 that is a sectional view of FIG. 42 as viewed from a direction of the arrow XLIII, the case 2 including the semi-product housed therein is placed inside a die (not shown) for the exterior resin 9. Then, by molding, a connector housing for external connection and a sensor exterior part are formed on the case 2. The opening 2c side of the case 2 is covered with the exterior resin 9.

Through the first to fourth steps described above, the rotation sensor 1 of the ninth embodiment is manufactured.

What is claimed is:

1. A rotation sensor for detecting rotation of a rotating body, comprising:
   a case comprising:
      a bottom surface portion provided at a distance from a surface of the rotating body; and
      a side surface portion connected to the bottom surface portion so as to define a hollow internal space in cooperation with the bottom surface portion,
         the case having an opening spatially connected to the hollow internal space, which is formed in the side surface portion on a side opposite to the bottom surface portion;
   a plurality of lead frames respectively having distal ends inserted into the case through the opening;
   a magnetic detection section provided to the distal ends of the plurality of lead frames arranged in parallel, for detecting a change in magnetic field of a magnetic body provided to the rotating body;
   a spacer provided between the plurality of lead frames and the side surface portion so as to be held in contact with an internal wall surface of the side surface portion; and
   an internal filling resin for filling a space portion of the hollow internal space except for the spacer, the magnetic detection section, and the plurality of lead frames,
   wherein:
   each of the plurality of lead frames has a positioning hole; and
   the spacer comprises positioning pins each being inserted into the positioning hole.

2. A rotation sensor according to claim 1, wherein a pair of the spacers are provided so as to be opposed to each other through the plurality of lead frames therebetween.

3. A rotation sensor according to claim 1, wherein the spacer comprises fitting means for fitting the spacer and the magnetic detection section to each other between the spacer and the magnetic detection section.

4. A rotation sensor according to claim 1, wherein the spacer comprises a rib projecting into a gap between the plurality of adjacent lead frames so as to ensure the gap.

5. A rotation sensor according to claim 1, wherein the spacer comprises positioning pins projecting so as to interpose both sides of each of the plurality of lead frames.

6. A rotation sensor according to claim 1, further comprising a positional alignment portion for positional alignment between the case and the spacer, the positional alignment portion being provided between the side surface portion of the case and the spacer.

7. A rotation sensor according to claim 1, wherein the bottom surface portion of the case has a shape corresponding to a shape of the magnetic detection section.

8. A rotation sensor for detecting rotation of a rotating body, comprising:
   a case comprising:
      a bottom surface portion provided at a distance from a surface of the rotating body; and
      a side surface portion connected to the bottom surface portion so as to define a hollow internal space in cooperation with the bottom surface portion,
         the case having an opening spatially connected to the hollow internal space, which is formed in the side surface portion on a side opposite to the bottom surface portion;
   a plurality of lead frames respectively having distal ends inserted into the case through the opening;
   a magnetic detection section provide to the distal ends of the plurality of lead frames arranged in parallel, for detecting a change in magnetic field of a magnetic body provided to the rotating body;
   a spacer provided between the plurality of lead frames and the side surface portion so as to be held in contact with an internal wall surface of the side surface portion; and
   an internal filling resin for filling a space portion of the hollow internal space except for the spacer, the magnetic detection section, and the plurality of lead frames,
   wherein:
   a pair of the spacers are provided so as to be opposed to each other through the plurality of lead frames therebetween;
   each of the plurality of lead frames has a positioning hole;
   one of the pair of spacers comprises a positioning pin to pass through the positioning hole; and
   another of the pair of spacers comprises a positioning hole opposed to the positioning pin.

9. A rotation sensor for detecting rotation of a rotating body, comprising:
   a case comprising:
      a bottom surface portion provided at a distance from a surface of the rotating body; and
      a side surface portion connected to the bottom surface portion so as to define a hollow internal space in cooperation with the bottom surface portion,
         the case having an opening spatially connected to the hollow internal space, which is formed in the side surface portion on a side opposite to the bottom surface portion;
   a plurality of lead frames respectively having distal ends inserted into the case through the opening;
   a magnetic detection section provided to the distal ends of the plurality of lead frames arranged in parallel, for detecting a change in magnetic field of a magnetic body provided to the rotating body;
   a spacer provided between the plurality of lead frames and the side surface portion so as to be held in contact with an internal wall surface of the side surface portion; and an internal filling resin for filling a space portion of the hollow internal space except for the spacer, the magnetic detection section, and the plurality of the lead frames, wherein:

a pair of the spacers are provided so as to be opposed to each other through the pluarlity of lead frames therebetween;

one of the spacers comprises a spacer convex-side fitting portion;

another of the spacers comprises a spacer concave-side fitting portion formed so as to be opposed to the spacer convex-side fitting portion;

each of the plurality of lead frames comprises a lead-frame interposing portion formed on a side of an end portion thereof, which is closer to an adjacent one of the plurality of lead frames; and the spacer convex-side fitting portion and the lead-frame interposing portion are fitted into the spacer concave-side fitting portion.

* * * * *